(12) United States Patent
Ferrero et al.

(10) Patent No.: US 9,700,952 B2
(45) Date of Patent: Jul. 11, 2017

(54) ELECTRIC SPOT WELDING HEAD FOR A MULTI-AXIS INDUSTRIAL ROBOT, AND ROBOT COMPRISING THIS HEAD

(71) Applicant: c/o Comau S.p.A., Grugliasco (Turin) (IT)

(72) Inventors: Fulvio Ferrero, Grugliasco (IT); Enrico Mauletti, Grugliasco (IT)

(73) Assignee: COMAU S.P.A., Gruglaisco (Turin) (IT)

( * ) Notice: Subject to any disclaimer, the term of this patent is extended or adjusted under 35 U.S.C. 154(b) by 1021 days.

(21) Appl. No.: 13/892,757

(22) Filed: May 13, 2013

(65) Prior Publication Data

US 2013/0306603 A1 Nov. 21, 2013

(30) Foreign Application Priority Data

May 15, 2012 (EP) .................................... 12168084

(51) Int. Cl.
*B23K 9/32* (2006.01)
*B23K 9/007* (2006.01)
(Continued)

(52) U.S. Cl.
CPC ............ *B23K 9/007* (2013.01); *B23K 11/115* (2013.01); *B23K 11/315* (2013.01); *B23K 11/36* (2013.01);
(Continued)

(58) Field of Classification Search
CPC ..... B23K 9/007; B23K 11/115; B23K 11/314; B23K 11/315; B23K 11/36
(Continued)

(56) References Cited

U.S. PATENT DOCUMENTS 4,517,435 A * 5/1985 Humblot .............. B23K 11/366
219/86.25
4,559,438 A * 12/1985 Nakadate ............. B23K 11/314
219/116
(Continued)

FOREIGN PATENT DOCUMENTS

EP 1878529 A 5/2004
IT EP 1878529 A2 * 1/2008 ........... B23K 11/314
(Continued)

OTHER PUBLICATIONS

International Search Report for EP12168084 dated Oct. 30, 2012.

*Primary Examiner* — Dana Ross
*Assistant Examiner* — Brandon Harvey
(74) *Attorney, Agent, or Firm* — Young Basile Hanlon & MacFarlane, P.C.

(57) ABSTRACT

An electric spot welding head for a multi-axis industrial robot that has a compact configuration, particularly in a longitudinal direction that goes from the end of the head for the attachment to the robot wrist towards the welding electrodes. This result is achieved primarily by the fact that the electrical transformer mounted on the head has its output connected to the electrode-holding arms arranged, respectively, on a front wall of the body of the transformer and on an end wall of the body of the transformer, for the connection to the electrode-holding arms of the head. The structure of the welding head is completely covered by a casing having a rear opening for connection to the robot wrist and a front opening from which the electrode arms of the welding head protrude.

6 Claims, 14 Drawing Sheets

(51) Int. Cl.
   *B23K 11/11*  (2006.01)
   *B23K 11/31*  (2006.01)
   *B23K 11/36*  (2006.01)
   *B23K 37/00*  (2006.01)
   *B23K 37/02*  (2006.01)
(52) U.S. Cl.
   CPC ........ *B23K 37/003* (2013.01); *B23K 37/0294* (2013.01)
(58) Field of Classification Search
   USPC ........................ 219/86.1, 86.25, 86.31, 86.33
   See application file for complete search history.

(56) References Cited

U.S. PATENT DOCUMENTS

| | | |
|---|---|---|
| 6,723,944 B1 | 4/2004 | Angel |
| 6,909,064 B2 | 6/2005 | Angel |
| 6,911,616 B2 | 6/2005 | Kilabarda et al. |
| 7,968,815 B2 * | 6/2011 | Murai ................. B23K 11/314 219/86.1 |
| 8,304,681 B2 | 11/2012 | Kilibarda |
| 2003/0189029 A1 * | 10/2003 | Kilabarda .......... B23K 11/3018 219/86.25 |
| 2004/0045938 A1 | 3/2004 | Angel |
| 2004/0045939 A1 | 3/2004 | Angel |
| 2004/0045940 A1 | 3/2004 | Angel |
| 2004/0195213 A1 | 10/2004 | Angel |
| 2007/0228018 A1 | 10/2007 | Murai et al. |
| 2008/0223170 A1 | 9/2008 | Tealdi et al. |
| 2010/0180711 A1 * | 7/2010 | Kilibarda ............ B05B 15/0225 74/490.06 |

FOREIGN PATENT DOCUMENTS

| | | |
|---|---|---|
| JP | 62009784 A * | 1/1987 |
| JP | 2004148378 A | 5/2004 |

\* cited by examiner

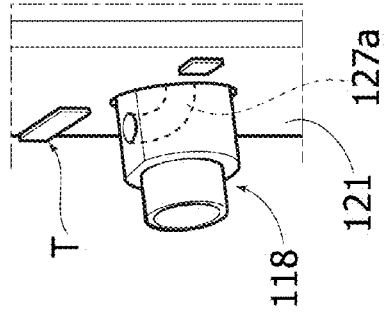
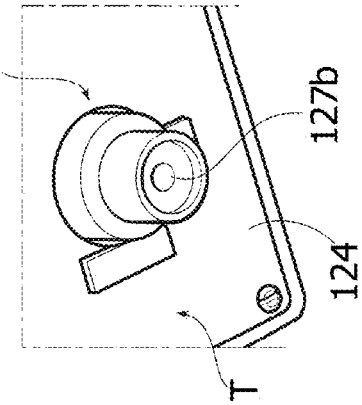
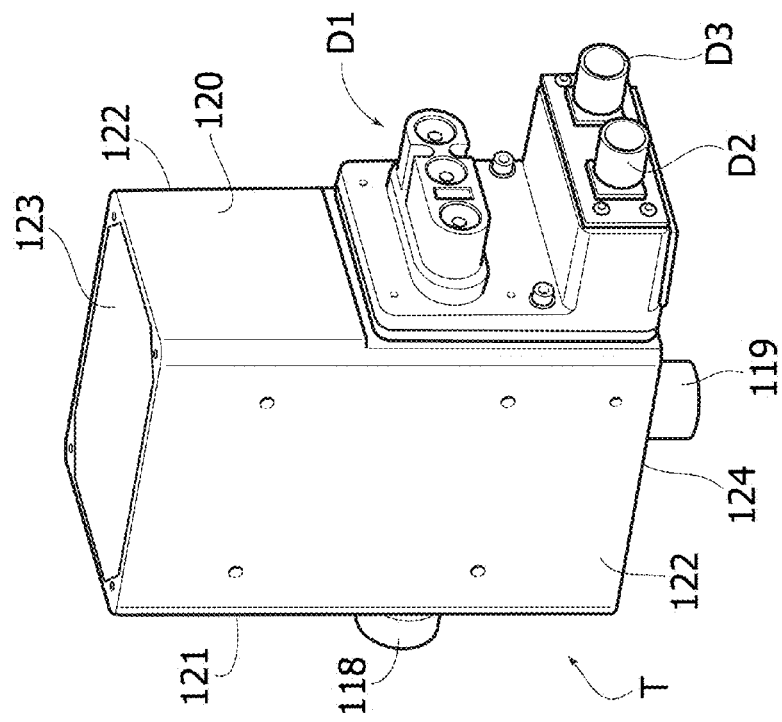

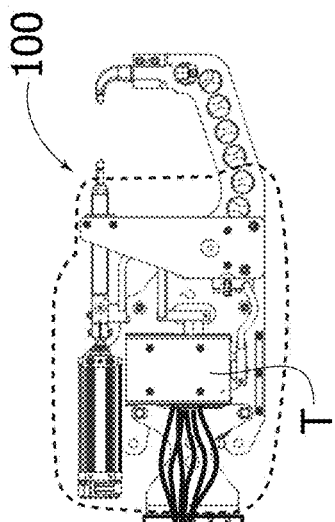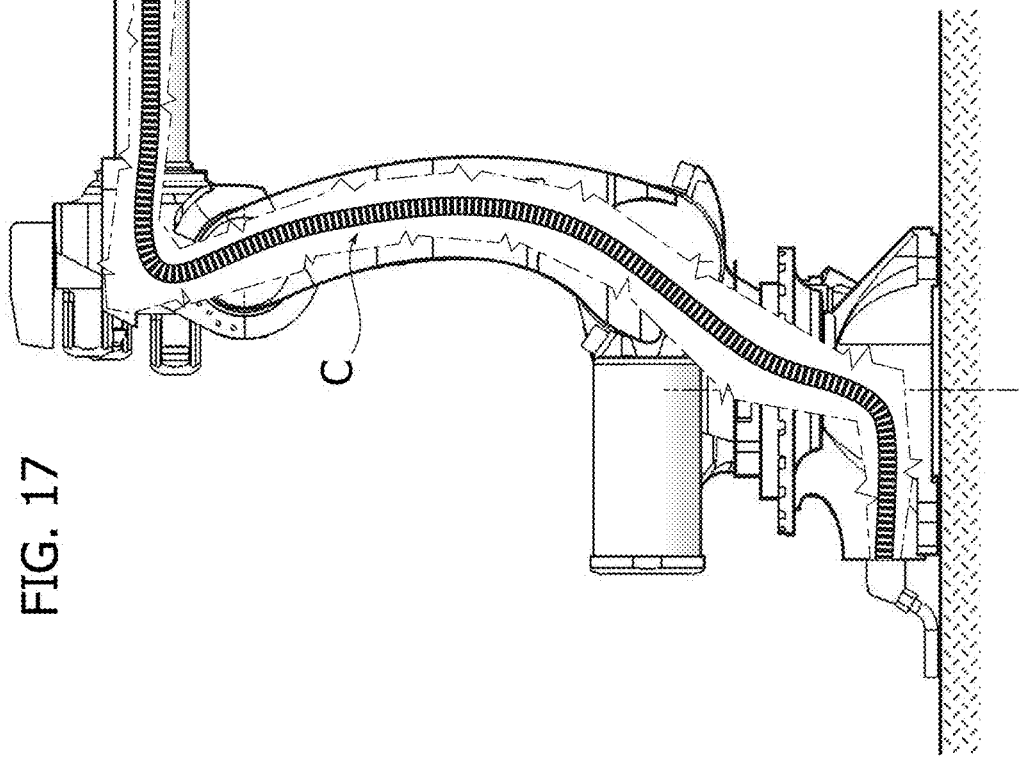

ELECTRIC SPOT WELDING HEAD FOR A MULTI-AXIS INDUSTRIAL ROBOT, AND ROBOT COMPRISING THIS HEAD

TECHNICAL FIELD

The present invention relates to the field of electric spot welding heads for multi-axis industrial robots.

SUMMARY

The present invention relates to the field of electric spot welding heads for multi-axis industrial robots, of the type comprising: a supporting structure with an end portion for attachment to the robot wrist, a pair of welding electrodes carried by respective electrode-holding arms mounted on the supporting structure, wherein at least one of the electrode-holding arms is movably mounted on the supporting structure of the head between an open position and a closed position, an actuator for the operation of the movable arm mounted on the supporting structure and an electric transformer for the application of the electrical welding voltage to the welding electrodes, having a casing with a rear wall facing the rear end portion for attachment to the robot wrist, a front wall opposite the rear wall, two side walls parallel to a general plane defined by the two electrode-holding arms and two end walls, the transformer further comprising an electrical connector for connecting the power cable of the welding head, and two output poles of the transformer, connected electrically to the two electrode-holding arms.

An object of the invention is the realization of a welding head which has compact dimensions, particularly in the longitudinal direction which goes from the end of the head arranged for attachment to the robot wrist towards the welding electrodes.

A further object of the invention is the realization of a head which guarantees a protection of the cables and/or pipes associated with the head against the risk of interference with foreign bodies during the use of robots in a production plant, and especially the risk of early deterioration of the cables and/or pipes due to exposure to aggressive external agents (welding splatter, dirt, etc.) that are present in an industrial production line. This deterioration implies in fact, in the known devices, frequent replacements (up to once every one or two years) of the harnessing, with consequent stops and low productivity of the robot.

In view of achieving these objectives, the invention relates to a welding head having the characteristics specified above and further characterized by the fact that the two output poles of the transformer, connected electrically to the two electrode-holding arms, are arranged as such: one on the front wall and the other on an end wall of the transformer casing.

Thanks to this provision, the linking strips connecting the output poles of the electrical transformer to the respective electrode arms can be arranged in configurations that guarantee a more compact size of the welding head, particularly in the longitudinal direction of the head, i.e. in a direction which goes from the end of the head arranged for attachment to the robot wrist towards the welding electrodes.

According to a further characteristic, the structure of the welding head is completely covered by a casing formed by two lateral half-shells of plastic material coupled together, having main walls parallel to the general plane of the two electrode-holding arms, the casing having a rear opening for the connection of the supporting structure of the welding head to a flange carried by the robot wrist and a front opening from which the two electrode-holding arms of the welding head protrude.

The head of the invention may be used in a robot of the type comprising a base structure, an articulated robot wrist and a chain of mutually articulated robot elements which connect the base structure to the robot wrist, wherein the robot wrist additionally ends with a flange to which a tool is rigidly connected that requires a power supply and/or a fluid supply, and wherein through the chain of mutually articulated robot elements and through the robot wrist an internal continuous passage is defined where one or more cables and/or pipes for the power supply and/or the fluid supply to the tool are received.

A robot of the type specified above is for example described and illustrated in U.S. Pat. No. 8,006,586, assigned to the assignee of the present invention, which is incorporated herein by reference in its entirety.

In robots of the type specified above, the harnessing of the cables and pipes for the power supply and the fluid supply to the welding head carried by the robot poses several problems. On the one hand it is necessary to prepare retaining and guiding systems for these cables and pipes which minimize the risk that they may interfere or become entangled with foreign bodies during the use of robots in a production line. On the other hand it is also necessary to guide these cables or pipes in order to reduce the deformation of bending and torsion as much as possible to which they are subject during the movements of the robot, and especially so as to reduce the deterioration to which the cables are subject by exposure to aggressive external agents (weld splatter, dirt, etc.) that are often found in industrial production lines. Exposure of cables to these agents often leads to greater and premature wear of such components, with the result that the harnessing of the cables and pipes must be replaced more frequently (even after only one or two years from the first use), consequently requiring a greater number of stops and a lower productivity of the robot. Finally, it is also important to prepare the harnessing in such a way that its replacement can be effected in a simple and rapid manner.

According to a further aspect, the present invention also relates to a multi-axis industrial robot including a compact welding head according to the invention and further characterized by the fact that the cables and/or pipes for the power supply and/or the fluid supply to the welding head continue without interruption in a passage formed through the flange of the robot up to the head, whereby the cables and/or pipes are arranged completely inside the robot and inside the head, without the need to provide separate cables or pipes for the head connected to the cables and the pipes of the robot in correspondence of the flange, as instead occurs in known solutions.

Therefore, in this specific embodiment, the welding head according to the invention is provided with electrical connectors and fluid connectors for direct connection of supply cables and pipes belonging to the robot, and is therefore devoid of its own cables and/or pipes, intended to be connected to cables and/or pipes of the robot.

An advantage of this solution is that the total protection of the supply cables and pipes completely avoids the premature wear of these components determined in the known solutions from contamination by aggressive external agents (weld splatter, dirt, etc.) present in the industrial environment. Experiments have allowed the assignee to predict that the invention will result in an enormous advantage in terms of less replacements of the harnessing of the robot, given that the average duration of a harnessing can change from a minimum time of about 1.5-2 years to a minimum time of about 8-10 years old, almost comparable to the life of the robot. The invention is therefore able to produce a real breakthrough in the practice of robot use.

Of course, the compact welding head according to the invention can also be used in a robot of the traditional type.

Furthermore, the robot described above, with cables and/or inner pipes to the robot that continue without interruption up to the welding head mounted on the robot, could also be used with a conventional welding head, or by any other type of tool.

It should also be noted that, for reasons of easier maintenance, the pipes for supplying fluid to the tool can still be provided with a separated end portion, associated with the tool and connected by means of quick couplings to the corresponding pipes associated with the robot. In this case, the basic principle of the invention is still applied to the electrical cables (of power and/or signal) associated with the robot.

BRIEF DESCRIPTION OF THE DRAWINGS

The invention will now be described with reference to the accompanying drawings, provided purely by way of a non-limiting example, wherein:

FIG. 4 is a perspective view of the electrical transformer arranged in the welding head of FIG. 1;

FIGS. 5-8 are perspective views on an enlarged scale that illustrate various details of the internal structure shown in FIG. 2;

FIG. 17 is a further schematic side view, partially sectioned, of the robot of FIG. 3; and FIG. 18 is a perspective view on an enlarged scale of the connection bracket between the flange of the robot and the supporting structure of the welding head.

DETAILED DESCRIPTION

Figure 1:
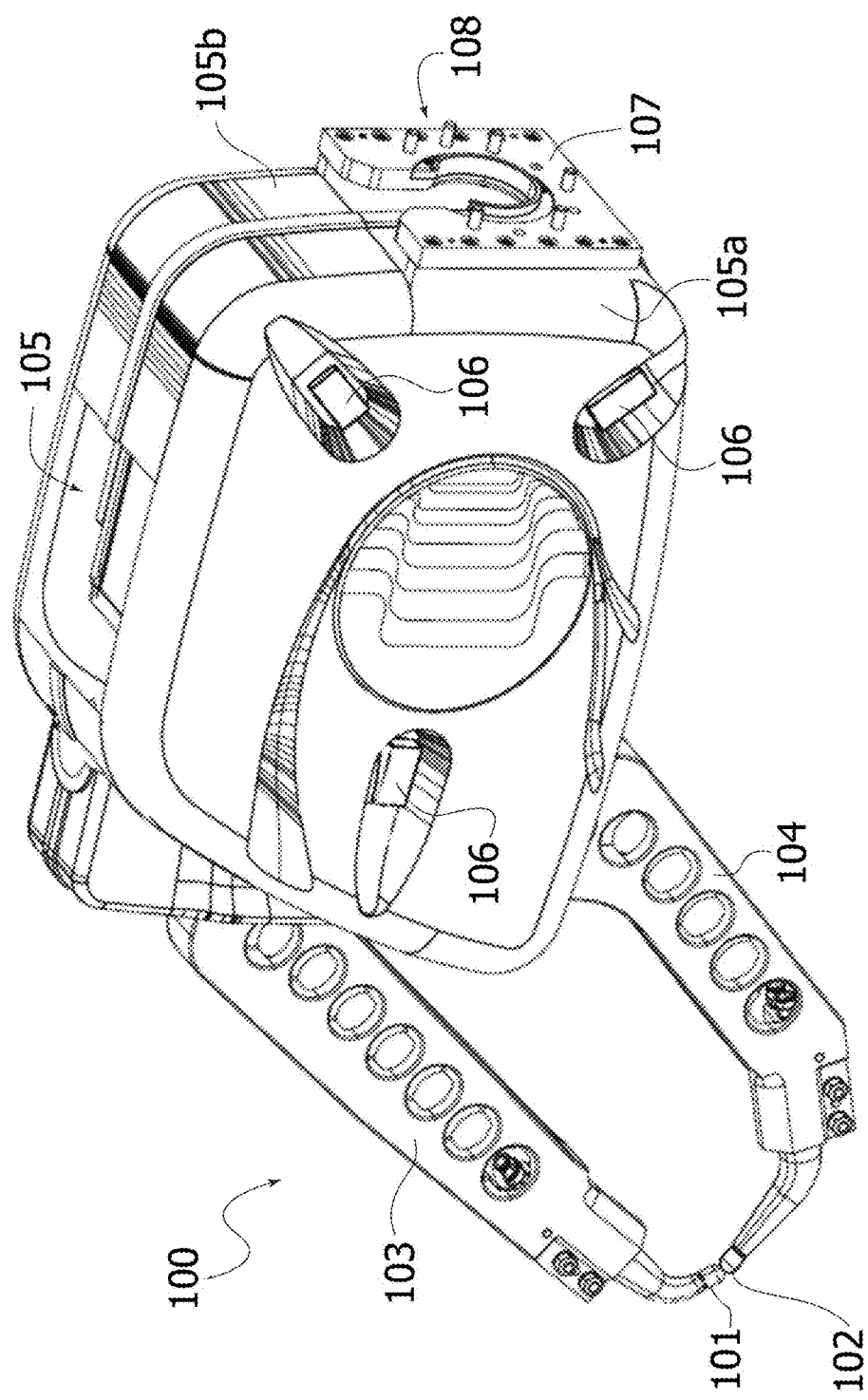
FIG. 1 is a perspective view of a first embodiment of the welding head according to the present invention.

FIG. 1 shows a perspective view of a first embodiment of the welding head according to the invention. The number 100 indicates the welding head as a whole, comprising two welding electrodes 101, 102 carried by respective electrode-holding arms 103, 104. The internal structure of the head is hidden by a casing 105, having a rear opening for connection to the robot wrist and a front opening from which the electrode arms 103, 104 of the welding head protrude. The casing 105 is formed by two lateral half-shells 105a, 105b coupled together, having main walls parallel to the general plane defined by the two electrode-holding arms 103, 104 and locked by the locking tie rod 106. FIG. 1 also shows the rear wall 107 of a connecting flange 108, best seen in FIG. 18, serving to connect the flange F of the robot wrist to the supporting structure of the welding head. As shown in FIG. 18, the bracket 108 includes the rear wall 107 and two wings 109 which are parallel and spaced, projecting orthogonally from the rear wall 107.

Figure 2:
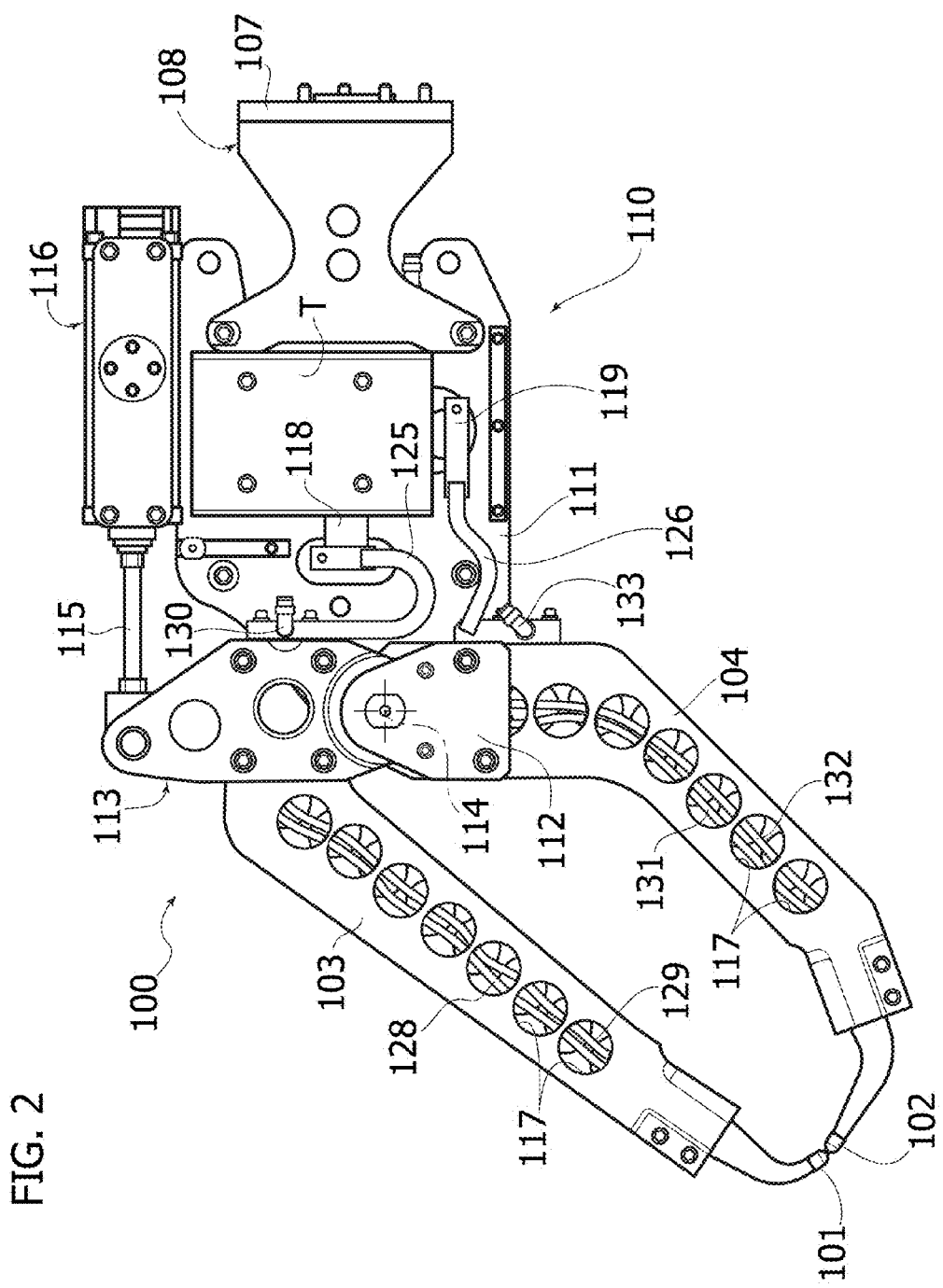
FIG. 2 is a schematic side view of the internal structure of the welding head of FIG. 1.
Figure 3:
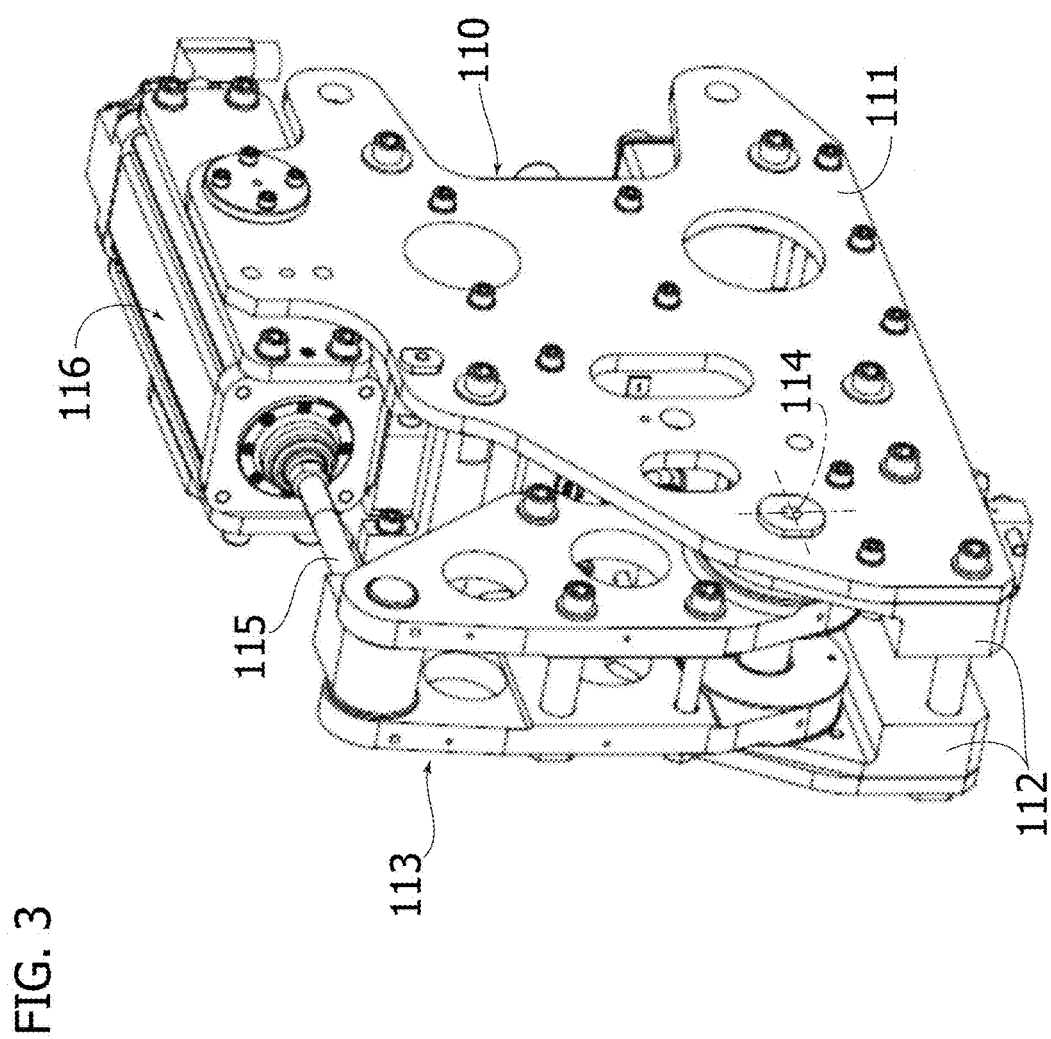
FIG. 3 is a perspective view of the internal structure of the head of FIG. 1.

With reference to FIGS. 2 and 3, the welding head 100 comprises a supporting structure 110, including two steel plates 111 which are parallel and spaced, rigidly connected to each other and parallel to the general plane defined by the two electrode-holding arms 103, 104, which are mounted between the two plates. The structure of the electrode-holding arm 104 is rigidly connected by screws to a pair of brackets 112 (FIG. 3) fixed to the inner surfaces of the two plates 111. The structure of the electrode-holding arm 103 is instead connected to an oscillating arm 113 which is articulately mounted between the two plates 111 around an axis of oscillation 114 and which is controlled by the stem 115 of an electro-mechanical actuator 116, it also being mounted between the two plates 111. The actuator 116 is itself a known type, comprising an electric motor, a gearbox and a nut placed in rotation by the electric motor via the gear unit. The rotation of the nut causes a linear movement of a screw screwed into it, this screw being connected to the stem 115. The components of the actuator 116 are not illustrated herein because, as the, this actuator is realizable according to any known configuration and the elimination of these details from the drawings renders the latter more readily and easily understood.

The electric welding current is carried across the electrodes 101, 102 by passing it through the structure of the arms 103, 104, made of aluminum, and having a hollow prism configuration, with side walls bearing lightening holes 117. The body of the arms 103, 104 is electrically connected to the two output poles 118, 119 of an electric transformer T arranged between the two plates 111 of the supporting structure of the welding head.

Also with reference to FIG. 4, the body of the transformer T has a rear wall 120 facing towards the flange of the robot, a front wall 121 opposite to it, two side walls 122, and end walls 123 and 124 (upper and lower, respectively, in the orientation shown).

According to a characteristic of the invention, which allows relaying of compactness to the welding head, the two output poles 118 and 119 of the transformer T are arranged on different walls of the body of the transformer. In the example shown, the pole 118 is provided on the front wall 121, while the pole 119 is provided on the lower end wall 124. The poles 118, 119 are also electrically connected to the structure of the respective arms 103, 104 by means of an elastically deformable strip 125, having a general U-shaped configuration (FIG. 2) and a strip 126, also elastically deformable, having a general S-shaped configuration. The arrangement of one of the two output poles of the transformer T (specifically pole 119) on the lower wall 124 of the transformer T allows reduction of the distance in the horizontal direction of FIG. 2 between the transformer T and the electrode-holding arms 103, 104. Therefore the size of the head results in being particularly reduced in its longitudinal direction, i.e. in a direction that goes from the flange of the robot towards the welding electrodes 101, 102.

Figure 7:
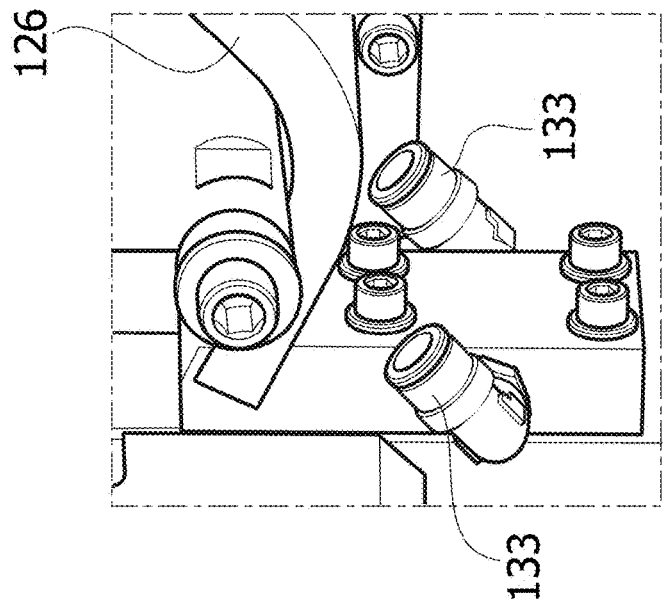
Figure 8:
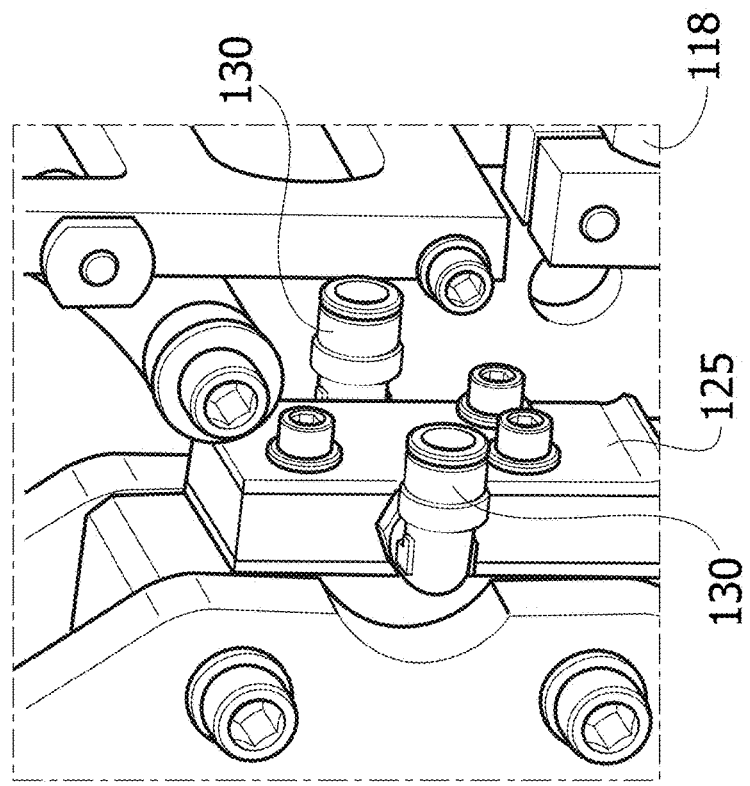

Both the transformer T and the welding electrodes 101, 102 require fluid-refrigeration. Therefore, in the bundle of cables and pipes that come from the robot at least one delivery pipe of the refrigerant fluid and at least one return pipe of the refrigerant fluid are included. With reference to FIGS. 4, 5 and 6, the delivery pipe of the refrigerant fluid sends the refrigerant fluid above all to the cooling circuit (not shown) provided inside the transformer T. From the internal cooling circuit to the transformer T, the refrigerant fluid flows through two channels 127a, 127b, formed respectively in the cylindrical bodies constituting the output poles 118, 119 of the transformer T. The duct 127a protrudes radially from the body 118, while the duct 127b protrudes coaxially, on the end of the terminal body 119. At the output end of the ducts 127a, 127b connectors (not shown) are arranged for connection pipes which lead the refrigerant fluid to the arm 103 and the electrode 101 and to the arm 104 and electrode 102, respectively. In particular (see FIG. 2) the electrode 101 then receives the refrigerant fluid through a flexible pipe 128 arranged through the inner cavity of the arm 103, the refrigerant fluid heated by the electrode 101 then being conveyed into another flexible pipe 129, it too being arranged in the internal cavity of the arm 103. The proximal ends of the pipes 128, 129 are connected via connectors 130 (see FIGS. 2 and 7). One of the two connectors 130 is connected by a flexible pipe to the connector arranged on the outlet end of duct 127a (FIG. 5) while the other connector 130 is connected to a flexible pipe (not shown) which returns to the inside of the robot, without passing through the transformer T. This duct carries the refrigerant return fluid from the electrode 101 to the robot. Additionally, within the arm 104, two flexible pipes 131, 132 are provided for sending the refrigerant fluid to the electrode 102 and for the return of the refrigerant fluid that has cooled the electrode 102. The two flexible pipes are indicated with 131, 132 and are connected to two connectors 133 (FIGS. 2 and 8). One of the two connectors 133 is connected by means of a flexible pipe (not shown) to the connector arranged onto the outlet end of the duct 127b (FIG. 6) while the other connector 133 is connected to a flexible pipe that is returned directly to the inside of the robot.

FIG. 4 of the accompanying drawings also shows that on the rear wall 120 of the transformer T a three-pole electrical connector D1 is provided, for the connection of electric power cables, with the three poles aligned in a direction parallel to the transverse direction of the head (i.e. the direction orthogonal to the general plane of the two arms). On the wall 120 an electrical connector D2 for electrical signal cables is also arranged. Such connectors are intended to receive cables coming directly from the robot, in the case of the application wherein the head is integrated in the robot and is not provided with its own cables and/or pipes. However, as already indicated, the head according to the invention can also be used in any known and conventional type robot, wherein the head can be quickly connected to the robot wrist and is provided with its supply cables and pipes that are connected to the cables and pipes belonging to the robot.

Figure 9:
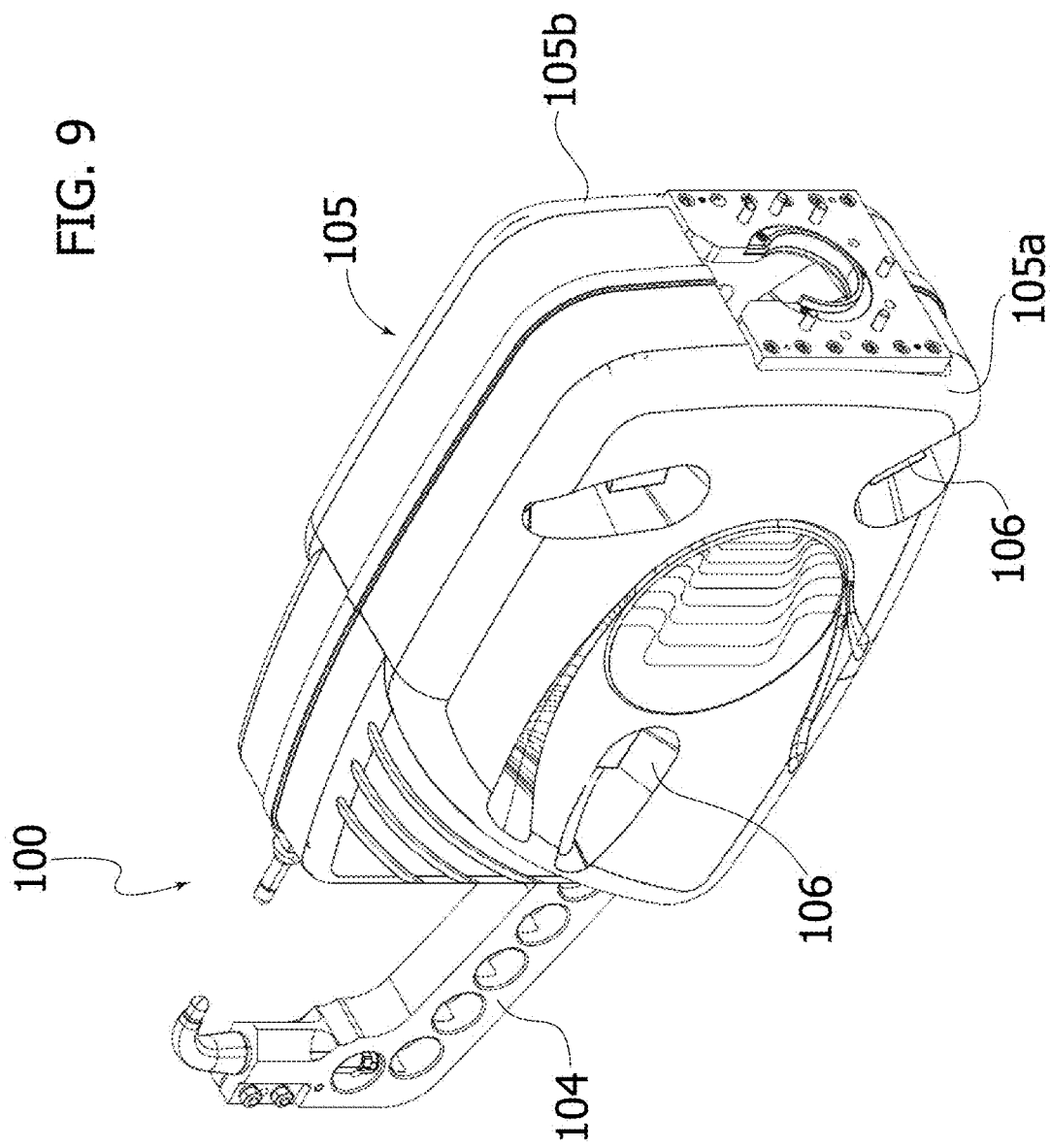
FIG. 9 is a perspective view of a second embodiment of the welding head according to the invention.
Figure 10:
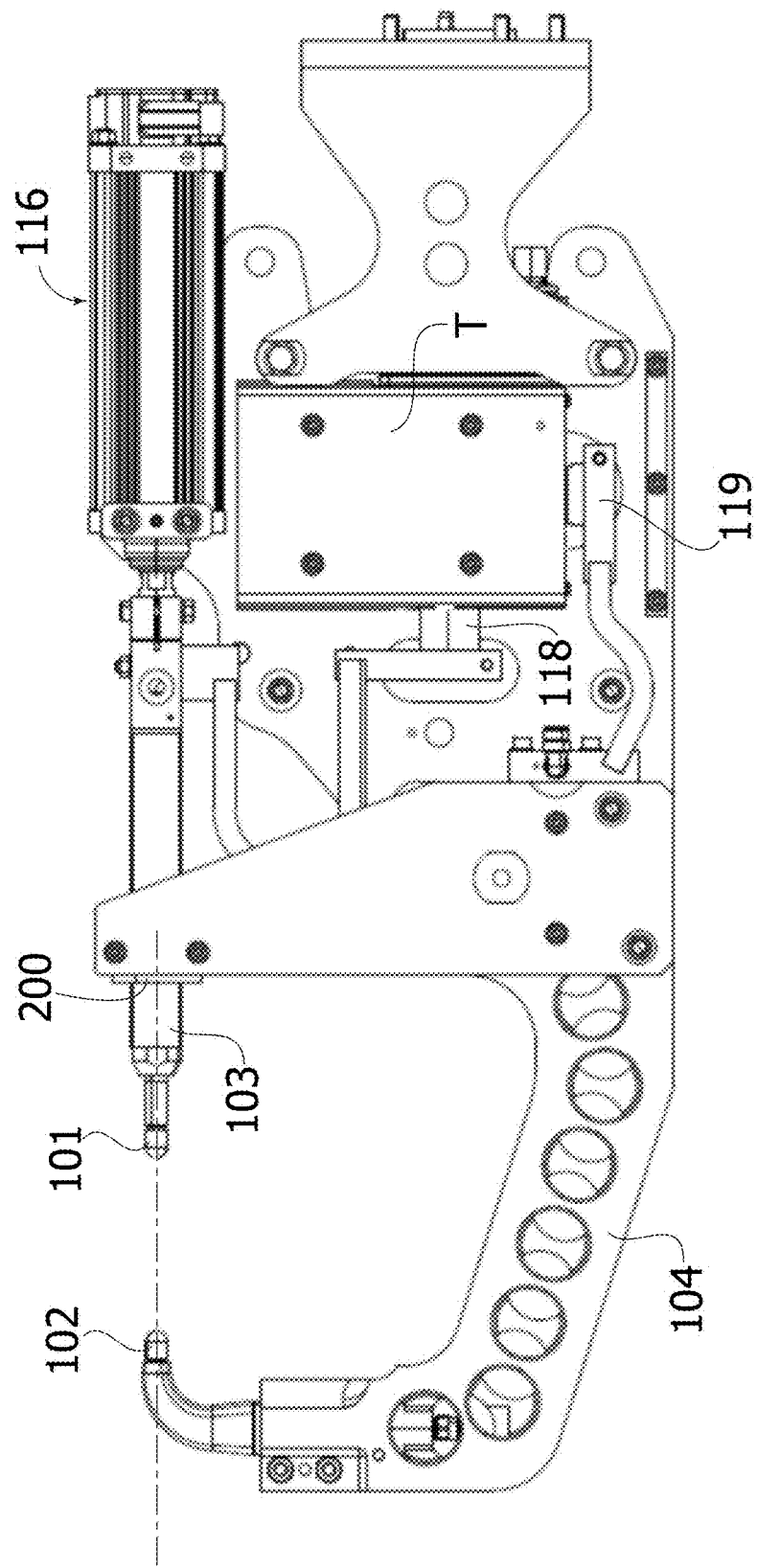
FIG. 10 is a schematic side view of the internal structure of the welding head of FIG. 9.
Figure 11:
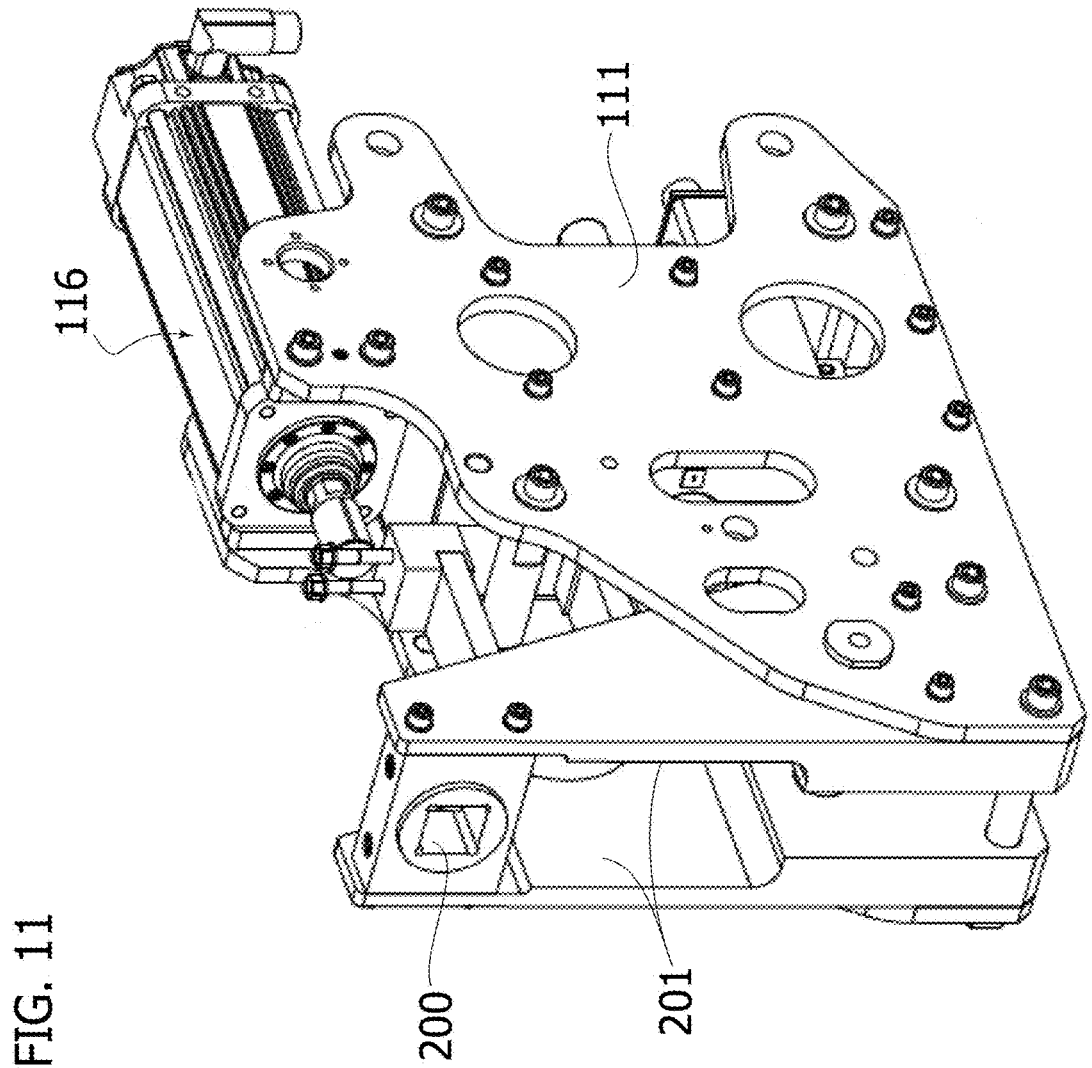
FIG. 11 is a perspective view of the internal structure of the welding head of FIG. 9.

FIG. 9 of the accompanying drawings is a perspective view illustrating a variation of FIG. 1 corresponding to the version with the sliding arm of the welding head. In this Figure, the parts common to those of FIG. 1 are designated by the same reference numbers. Also in this case the structure of the welding head 100 is completely covered by a casing 105 consisting of two half-shells 105a, 105b joined together by tie rod connecting means to 106. The supporting structure of the welding head of FIG. 9 is visible in the FIGS. 10 and 11. It is essentially analogous to that of the version already described above except that in this case the fixed arm 104 has an elbow configuration in such a way that the electrode 102 is disposed on the axis of the actuator 116. The other arm 103 is constituted by a slidably guided stem within a prismatic guide 200 carried at the ends by two plates 201 fixed to the plates 111 of the head structure. The stem 103 is connected at its end to the stem of the actuator 116 so as to be linearly displaceable along the axis of the actuator 116 between an open position, wherein the electrodes 101, 102 are spaced apart, and a closed position, wherein these electrodes are in contact with each other. The arrangement of the transformer T is identical to that described above with the output poles of the transformer T disposed on the front wall and on the lower wall of the transformer. In this case, the elastically deformable strip 125 has a U-shaped configuration orientated horizontally (FIG. 10) instead of vertically as in the case of the FIG. 2 version and is directly connected to the stem constituting the arm 103. Also in this case a cooling circuit of the electrodes is of course provided, similar to that described above with reference to FIG. 2, which is not shown in FIG. 10 for greater simplification of the drawing.

Figure 12:
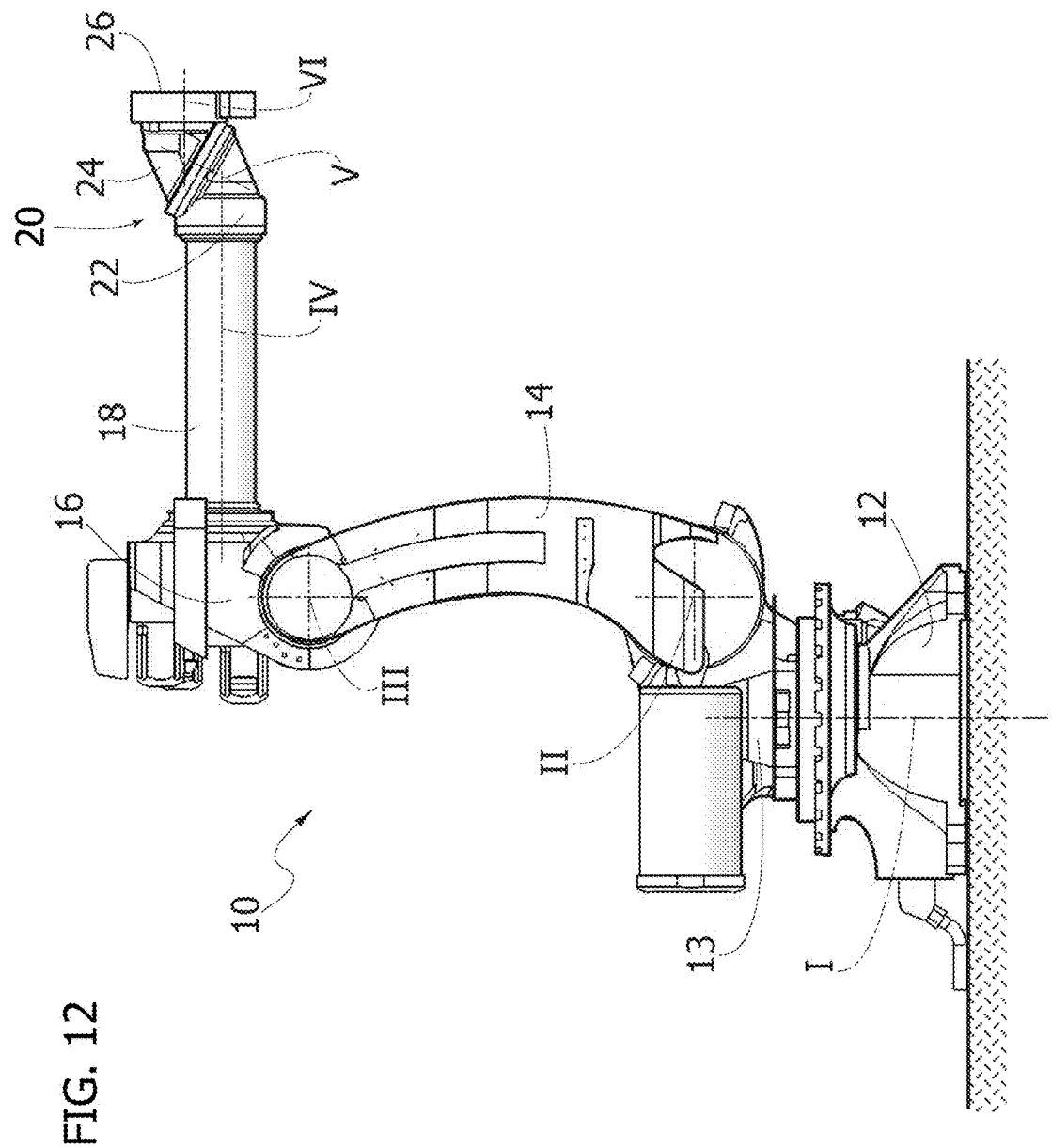
FIG. 12 is a schematic representation of a multi-axis industrial robot according to U.S. Pat. No. 8,006,586, assigned to the assignee of the present invention, reported here purely by way of example of a robot on which the welding head of the invention is applicable.

As repeatedly stated, the welding head according to the invention can be used on any robot of known type. Merely by way of example, FIG. 12 shows the known robot from U.S. Pat. No. 8,006,586, assigned to the assignee of the present invention.

In the case of the example illustrated in FIG. 12, the robot 10 comprises a base structure 12 which supports an upright 13 rotatable about a first vertical axis I. The upright 13 in turn supports a vertical arm 14 rotatable about a second axis II, directed horizontally. The upper end of the vertical arm 14 in turn supports a structure 16 supporting an arm 18, rotatable around a third axis III, directed horizontally. The arm 18 is supported by the structure 16 around a fourth axis IV, which coincides with the main axis of the arm 18. The distal end of the arm 18 carries an articulated wrist 20 which is illustrated on an enlarged scale and in section in FIG. 13. As will be apparent in the following section, a characteristic of the wrist 20 resides in the fact that it is a hollow wrist, adapted to define a continuous passage within itself wherein the bundle of supply cables and pipes of the tool can be guided. It is evident, however, that the teachings of the present invention are also applicable to a robot having any different configuration and in particular a hollow wrist of a different configuration from that illustrated here by way of example.

Figure 13:
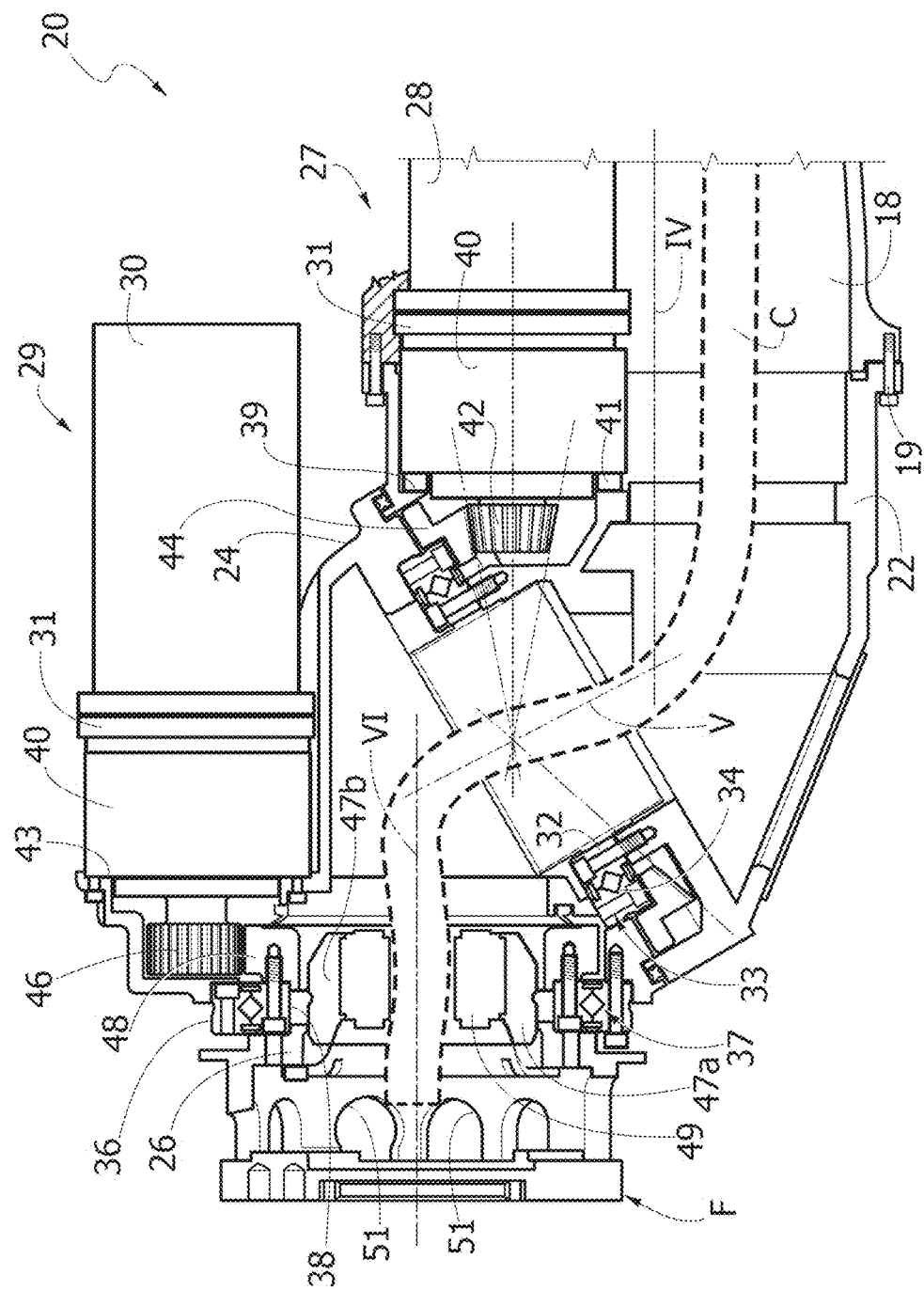
FIG. 13 is a view on an enlarged scale and in section of the robot wrist of FIG. 12.

With reference to FIG. 13, the wrist 20 comprises a first essentially elbow-shaped hollow body 22, and including a first and a second end and a passing cavity, leading to these ends. The first end of the first hollow body 22 is intended to be rigidly connected by means of screws 19 to the robot arm 18 rotatable about the axis IV. The wrist 20 comprises, moreover, a second essentially elbow-shaped hollow body 24, and comprising a first and a second end and a passing cavity leading to these ends. The first end of the second hollow body 24 is mounted on the second end of the first hollow body 22, rotatable about a V axis inclined with respect to the first axis IV. The wrist 20 finally comprises a third hollow body 26 comprising a first and a second end and a passing cavity leading to these ends. The first end of the third hollow body is mounted on the second end of the second hollow body 24, rotatable about an axis VI inclined with respect to the second axis V.

As already indicated, the passing cavities of the first, second and third hollow bodies 22, 24, 26 form a continuous passage along the axes IV, V, VI, through which cables and/or pipes for the power/fluid supply are arranged as well as the control of the tool associated with a flange F carried by the third hollow body 26. The passage has a substantial capacity whereby the total number of cables and/or pipes that it can receive is considerable.

For example, in the case the tool is an electric spot welding head, the power supply lines that pass through the internal passage of the robot wrist comprise two delivery pipes of a refrigerant fluid, two return pipes of the refrigerant fluid, a cable for the control signal of an electric driven motor of the head, a power cable of this electric motor, a multi-bus cable, and three power supply cables (or, alternatively, a single power cord with three wires) for the electric welding current.

Again with reference to the illustrated example, the axes IV and VI are inclined with respect to the axis V of an angle between about 50° and 70°. Preferably, this angle of inclination is 60°. This choice of inclination of the axis of rotation V, relative to the axes IV and VI, allows the obtaining of a wide working-range of the robot wrist, and at the same time guarantees a simple and continuous passage of cables and/or pipes within the wrist. As can be seen, in the condition wherein the axes IV, V, VI are coplanar, they define a Z configuration.

Again with reference to the illustrated example, at the connection between the arm 18 and the hollow body 22 housing for a first group gearmotor 27 is provided. According to the size of the first hollow body 22 and of its cylindrical portion intended to be coupled to the arm 18 of the robot, the housing for the first gearmotor 27 can be entirely contained in the first hollow body 22 or even partially in the arm 18 of the robot, but always in such a way that the first gearmotor 27 is essentially included within the volumes defined by the geometry of the arm 18 and the first hollow body 22, with particular reference to the bulk of the section of this arm. In correspondence of the second hollow body 24 a further housing for a second gearmotor 29 is provided. In particular, as visible in FIG. 13, the hollow body 24 externally presents a seat on its side wall wherein the second gearmotor 29 is received, essentially orientated parallel to the axis VI. Thanks to the elbow conformation of the hollow bodies 22 and 24, the gearmotor 29 is found spaced from the walls of the hollow body 22 so as to never interfere with the latter whatever the angular position assumed by the hollow body 24 with respect to the hollow body 22. The particular arrangement of the gearmotor 29 described above allows maintaining of the transverse bulk of the wrist within a limited threshold. Also, since the gearmotor 29 is inclined with respect to the axis V of an angle equal to the angle of inclination of the axis VI respect to the axis V, in this case equal to about 60° when it is brought into rotation by the hollow body 24, the inertia forces opposing the rotary motion of the gearmotor 29 are limited.

Between the first hollow body 22 and the second hollow body 24 a single crossed roller bearing 33 of a known type is arranged, having an inner ring 32 and rigidly connected to the first hollow body 22, while an outer ring 34 is rigidly connected to the second hollow body 24. A single crossed roller bearing 37 is also provided between the second hollow body 24 and the third hollow body 26, with an outer ring 36 rigidly connected to the second hollow body 24 and an inner ring 38 rigidly connected to the third hollow body 26.

Each gearmotor 27, 29 comprises a motor 28, 30, a coupling flange 31, a gearbox 40 as already indicated above, and a pinion 42, 46. The gearboxes 40 are characterized by a high transmission ratio and are preferably of the epicyclic or harmonic type. Each gearbox 40 is coupled at one of its end to its relative motor 28, 30 through the coupling flange 31. The coupling flange is connected by screws 35a to the motor 28, 30 and to the gearbox by means of other screws 35b.

At the other end, the gearbox 40 carries the pinion 42, 46 for the transmission of motion, which is now fixed by means of a plurality of screws 35c. The first gearmotor 27 comprising the first motor 28, gearbox 40 and a bevel pinion 42 is fixed by screws in abutment with a wall 39 of the bottom of the respective housing. Between the wall 39 of the bottom of the housing and the end of the gearbox to which the bevel pinion 42 is fixed, a flange 41 for fixing and adjustment of the clearance is interposed. During assembly of the wrist, the thickness of the bushing 41 is adapted so as to obtain the correct meshing of the pair of bevel gears. The bevel pinion 42 meshes with the internal teeth of a ring bevel gear 44, and this, being fixed by means of screws (not shown) to the outer ring 34 of bearing 33, is rigidly connected to the second hollow body 24. The second gearmotor 29 comprising the second motor 30, gearbox 40 and a cylindrical pinion 46 is inserted into the housing formed in the second hollow body 24 and is fixed in abutment with a wall 43 of the bottom of the housing by means of screws. The cylindrical pinion 46 meshes with a cylindrical ring wheel 48 which is fixed to the inner ring 38 of bearing 37. The motion of rotation from the motor 28 is transformed through the gearbox 40 and transferred to the bevel pinion 42 which rotates the ring bevel gear 44 rigidly connected to the outer ring 34 of bearing 33 in turn fixed to the second hollow body 24. In this way, the rotation of the second hollow body 24 about the axis V is carried out. When the second motor 30 is activated, the rotation is transferred through the gearbox 40 to the cylindrical pinion 46. The cylindrical pinion 46 meshes with the wheel cylinder 48, which is rigidly connected to the inner ring 38 and the third hollow body 26. In this way the rotation of the third hollow body 26 around the axis VI is carried out.

The internal cavity of the wrist allows the passage of supply cables and/or ducts C of the welding head intended to be associated with the flange F. These cables and/or ducts C are associated with a bushing 47.

A possible application of the welding head according to the invention provides for the mounting of the head of a robot of the known type illustrated in FIGS. 12, 13 described above. According to the art, this assembly is performed with the aid of a quick attachment system and provides a connection between supply cables and pipes belonging to the robot and cables and pipes belonging to the head.

A further advantageous application is that which provides a complete integration of the welding head according to the invention into a robot of the type specified above, with elimination of cables and pipes of the head and direct connection of cables and pipes of the robot to connections provided on the head. Such integration could also be realized with a different welding head from that forming the subject of the present invention or by any other type of tool.

Figure 14:
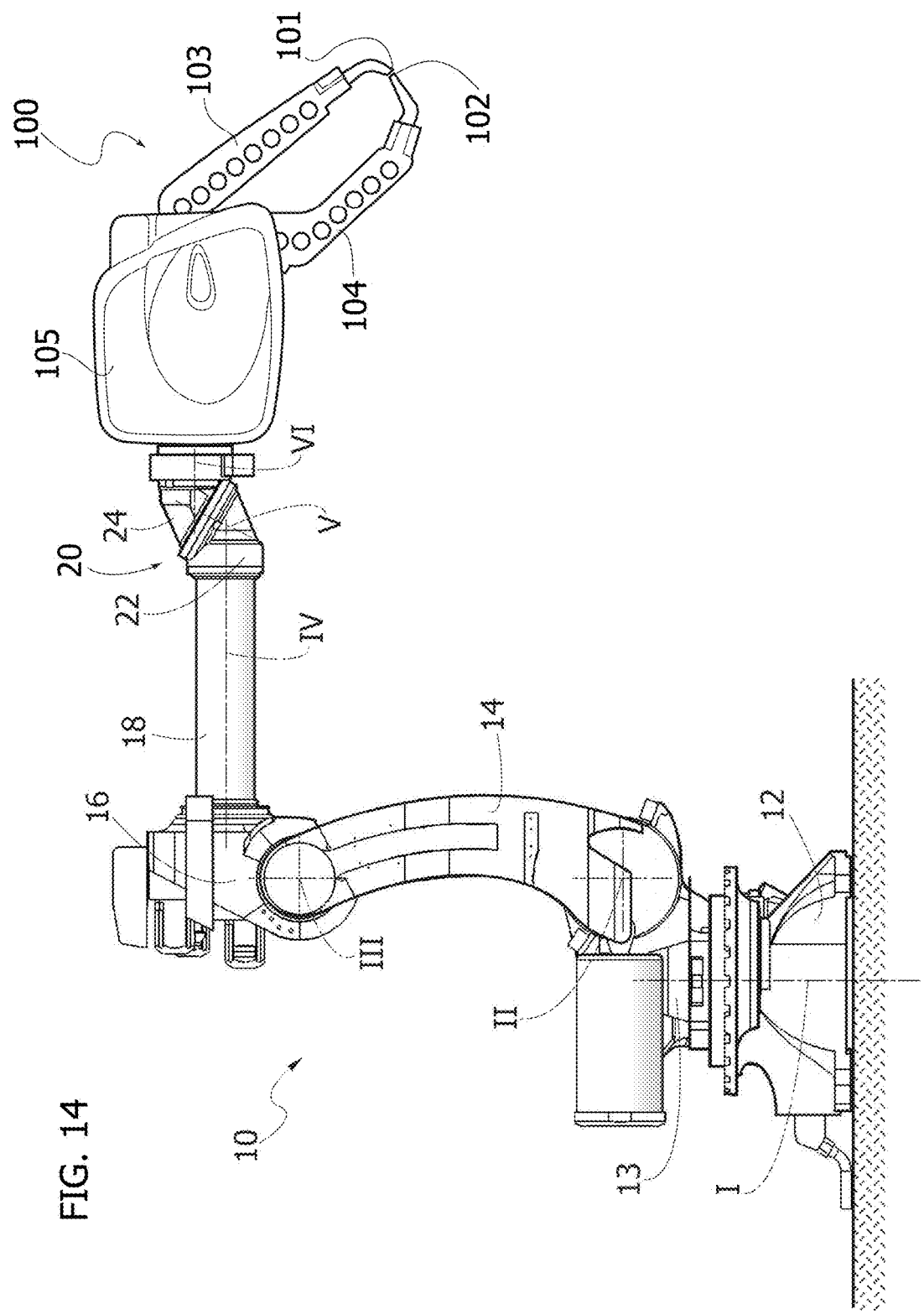
FIG. 14 is a side view in elevation, schematic, of a first embodiment of robots according to the invention.

FIG. 14 of the accompanying drawings shows a first variant of this solution of a robot with integrated head. In this Figure, the parts common to those of FIG. 12 are designated by the same reference number.

FIG. 14 shows an embodiment wherein the welding head of FIG. 1 is integrated into the robot, wherein one of the two electrode-holding arms is fixed, while the other arm is oscillatingly mounted. In place of such a welding head with oscillating arm, it is possible, however, to provide a welding head of the type shown in FIG. 9, wherein one of the two electrode-holding arms is fixed and the other arm is linearly slidable, as specifically shown in FIG. 17.

As seen in FIG. 17, the robot shown and the known robot of FIG. 12 have in common the fact that through the entire chain of robot elements and through the robot wrist a continuous internal passage is defined wherein the bundle C of supply cables and pipes is received. In FIG. 17, the case wherein all the cables and pipes are contained within a single flexible sheath is illustrated, but of course this feature is not essential and the bundle of cables and pipes may simply be provided along its extension of a plurality of tightening clamps.

In the case of known robots, and also in the specific case of the known robot illustrated in FIGS. 12, 13, the bundle of supply cables and pipes is interrupted in correspondence of the connection flange F of the tool associated with the robot. Typically, such a flange is provided with a plurality of connections for the connection of cables and pipes arranged on the robot with separate cables and/or pipes that are associated with the welding head mounted on the robot.

In contrast to this arrangement, in the robot of FIGS. 14-17 no rapid replacement of the welding head carried by the robot is provided, and the welding head is not provided with separate cables and pipes that are connected to cables and pipes of the robot when the head is mounted on the robot flange. As clearly visible in FIGS. 16, 17, in the case of the robot shown in these Figures, the cables and pipes that pass through the entire extension of the robot and the hollow robot wrist continue without interruption in a passage formed through a central opening F1 of the robot flange F (FIG. 16) up to an input connector provided on the electrical transformer T arranged within the structure of the welding head.

As will be apparent from the description that follows, the invention therefore provides for a single cable bundle that crosses the entire robot, the robot wrist and reaches the user equipment on board of the tool, in such a way that the entire extension of the bundle of cables and pipes is completely contained within the structure of the robot, within the structure of the wrist and within the structure of the welding head.

Therefore, in the case of the specific application illustrated in FIGS. 14-17, the welding head is fully integrated into the robot, so that the robot and welding head together form a single "welding machine", without any distinction between the "robot" part and the "tool" part and without any possibility of rapid replacement of the tool. This solution, compared to the known solution from U.S. Pat. No. 8,006,586, assigned to the assignee of the present invention, has the advantage of not providing for any connector of the connection between cables and pipes of the robot and separate cables and pipes arranged on board of the welding head and therefore does not entail the drawback of this known solution, wherein the cables and pipes associated with the head, which extend from the flange of the robot towards the head, are at least partially exposed to the outside.

As we have seen, this advantage is further enhanced by providing the outer casing 105 for the welding head that forms a prolongation of the robot body and that completely hides the stretch of cables and pipes that extend beyond the flange of the robot.

Figure 15:
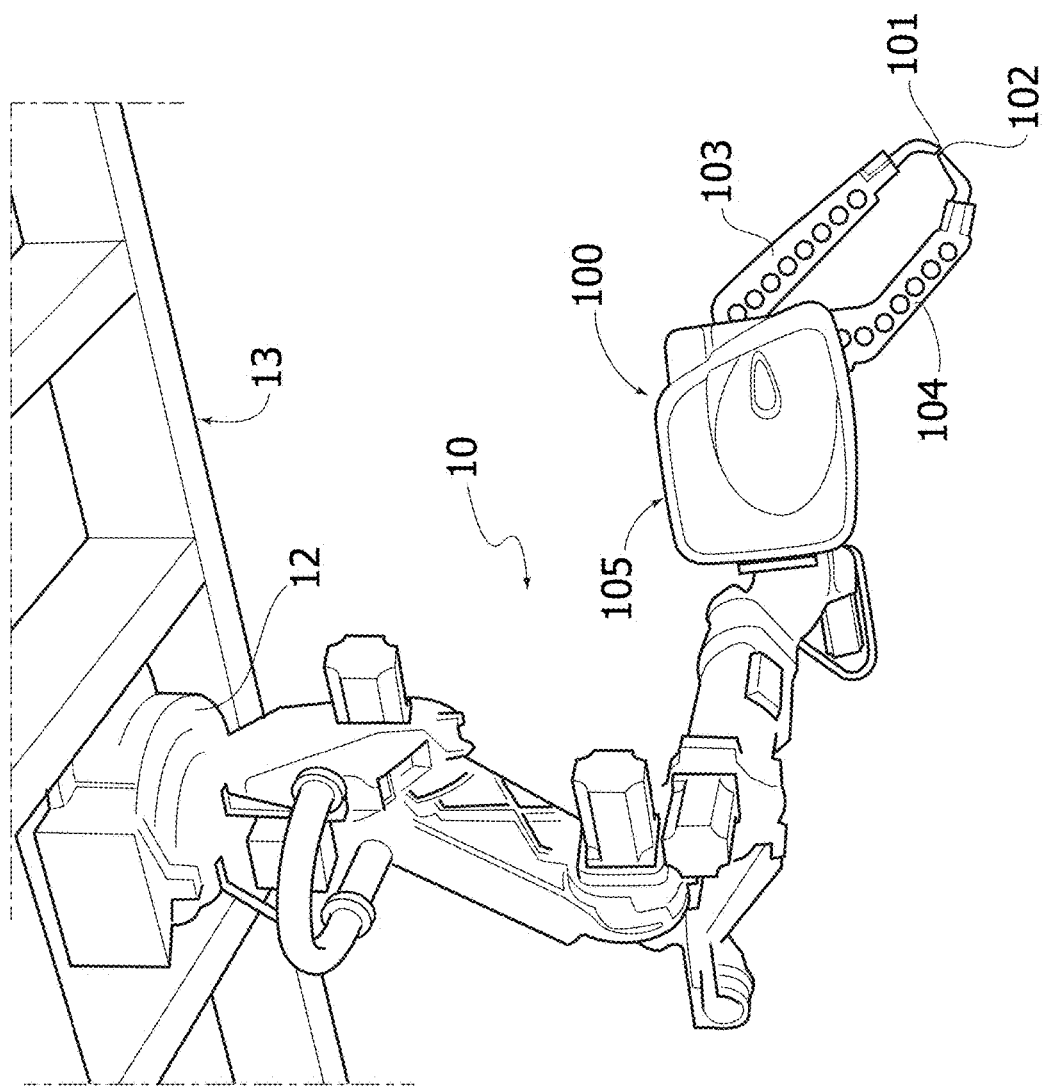
FIG. 15 is a schematic perspective view of a second embodiment of the robot of the invention.

FIG. 15 shows a further application of the invention wherein the robot 10 has a structure essentially identical to that of the robot of FIG. 14 but is mounted in the inverted position, with the base structure 12 fixed to a "ceiling" 13 (an overhead frame) of an industrial plant.

Figure 16:
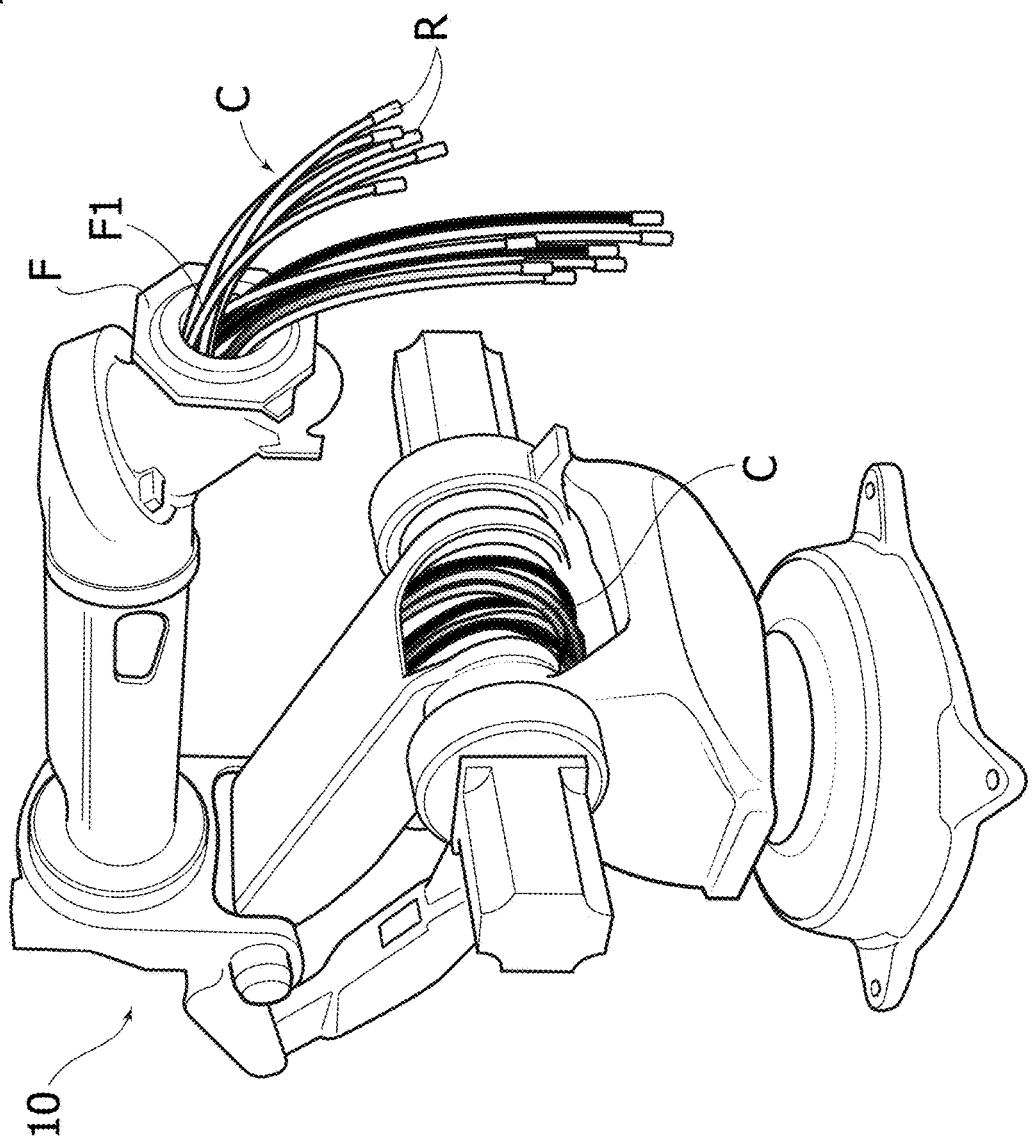
FIG. 16 is a perspective view of the robot of FIG. 14, with the welding head removed.

FIG. 16 shows the robot of FIG. 14 with the welding head disassembled and highlights, as in the robot according to the invention, the bundle of cables and pipes C coming out through a central opening F1 of the robot flange F and continuing directly up to connectors R that connect directly to electrical connectors and the hydraulic couplings provided inside of the welding head. The bundle C thus goes from the base of the robot up to the equipment inside the welding head remaining completely hidden within the structure of the robot and inside the casing 105 of the welding head 100 without any exposed part, even in the final stretch between the flange F of the robot and the equipment inside the welding head, and without any interruption or connection of cables or pipes at the robot flange. This provision is also clearly visible, as already described above, in FIG. 17, which refers by way of example to the case of a welding head of the sliding electrode type, it being understood that it is also immediately applicable to the case of a welding head with oscillating arm.

Of course, without prejudice to the principle of the invention, the details of construction and the embodiments may widely vary with respect to what is described and illustrated purely by way of example, without departing from the scope of the present invention.

In particular, as repeatedly pointed out, the welding head according to the invention can be used in any type of robot, the applications illustrated here being provided solely by way of example.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electric spot welding head for a multi-axis industrial robot, comprising:
    a supporting structure with an end portion for attachment to a robot wrist;
    a pair of welding electrodes carried by respective electrode-holding arms mounted on the supporting structure, wherein at least one of the electrode-holding arms is movably mounted on the supporting structure between an open position and a closed position, the electrode-holding arms defining a general plane;
    an actuator positioned parallel to the holding arms for driving the movable electrode-holding arm mounted on the supporting structure; and
    an electrical transformer for application of an electrical welding voltage to the welding electrodes, the transformer having a housing with a rear wall facing towards the end portion, a front wall opposite to the rear wall, two side walls parallel to the general plane of the electrode-holding arms and two end walls, the transformer further comprising an electrical connector for connection of a power cable of the welding head and two output poles, one of the two output poles arranged on the front wall and the other of the two output poles is arranged on one of the two end walls, wherein the two output poles are electrically connected to the two electrode-holding arms, wherein each of the output poles of the electrical transformer further comprise a cylindrical body defining an integral internal passage for a refrigerant fluid connected to a cooling circuit of the welding electrodes; and wherein the welding head is completely covered by a casing consisting of two lateral half-shells, made of plastic coupled together, having main walls parallel to the general plane of the two electrode-holding arms, the casing having a rear opening for connection of the supporting structure to a flange carried by the robot wrist and a front opening from which the two electrode-holding arms of the welding head protrude.

2. The electric spot welding head according to claim 1, wherein the head is provided with electrical connectors and fluid connectors for direct connection of continuous and uninterrupted power supply cables and fluid supply pipes originating from the robot and routed through a continuous and uninterrupted internal passage in the robot wrist and into the welding head to respective of the electrical connector connected to the transformer and a cooling circuit positioned within the transformer, and is therefore devoid of at least one of separate and independent cables originating in the welding head intended to be connected to cables of the robot, or pipes intended to be connected to pipes of the robot.

3. The electric spot welding head of claim 1 wherein the other of the two output poles arranged on the end wall is immediately adjacent to and orthogonally oriented to the front wall.

4. An electric spot welding head for a multi-axis industrial robot, comprising:
   a supporting structure with an end portion for attachment to a robot wrist;
   a pair of welding electrodes carried by respective electrode-holding arms mounted on the supporting structure, wherein at least one of the electrode-holding arms is movably mounted on the supporting structure between an open position and a closed position, the electrode-holding arms defining a general plane;
   an actuator positioned parallel to the holding arms for driving the movable electrode-holding arm mounted on the supporting structure; and
   an electrical transformer for application of an electrical welding voltage to the welding electrodes,
   wherein the supporting structure comprises two support plates parallel to each other and spaced, rigidly connected to each other and parallel to the general plane of the two electrode-holding arms, the electrode-holding arms, the transformer and the actuator being mounted between the support plates,
   wherein the welding head is completely covered by a casing consisting of two lateral half-shells, made of plastic coupled together, having main walls parallel to the general plane of the two electrode-holding arms, the casing having a rear opening for connection of the supporting structure to a flange carried by the robot wrist and a front opening from which the two electrode-holding arms of the welding head protrude,
   said welding head having a longitudinal direction extending from said front opening to said rear opening, and
   wherein the support plates are fixed to a rear of a bracket for attachment to a flange carried by the robot wrist, the bracket having a U-shaped configuration, with two wings fixed respectively to the two support plates, said two wings being parallel to the support plates and extending from rear ends of the support plates in the longitudinal direction of the welding head, said bracket having a rear wall connecting the two wings, for attachment to the robot flange, said rear wall extending in a plane orthogonal to the longitudinal direction of the welding head, outside said casing at said rear opening of the casing and defining a U-shaped open slot facing rearwardly in the longitudinal direction of the welding head, for through receipt of power supply cables or fluid supply pipes of the welding head.

5. A multi-axis industrial robot, comprising:
   a base structure;
   an articulated robot wrist ending with a flange for attachment of an electric spot welding head, which requires at least one of a power supply or a supply of fluid;
   a chain of mutually articulated robot elements connecting the base structure to the robot wrist, wherein through the chain of mutually articulated robot elements and through the robot wrist a continuous internal passage is defined wherein one or more supply cables for the power supply and supply pipes for the fluid supply to the spot welding head are received; and
   an electric spot welding head comprising:
      a supporting structure having two support plates;
      a pair of welding electrodes carried by respective electrode-holding arms mounted on the supporting structure, wherein at least one of the electrode-holding arms is movably mounted on the supporting structure between an open position and a closed position;
      an actuator positioned parallel to the holding arms for driving the movable electrode-holding arm mounted on the supporting structure;
      the electrical transformer for application of an electrical welding voltage to the welding electrodes, the transformer having a housing with a rear wall facing towards the end portion, a front wall opposite to the rear wall, two side walls parallel to a general plane of the electrode-holding arms and two end walls, the transformer further comprising an electrical connector for connection of a power cable of the welding head and two output poles, one of the two output poles arranged on the front wall and the other of the two output poles is arranged on an end wall, wherein the two output poles are respectively electrically connected to the two electrode-holding arms; and
      a bracket for selective attachment to a robot wrist flange, the bracket having a U-shaped configuration including two wings fixed respectively to the two support plates and a rear wall for attachment to the flange, the bracket further defining a U-shaped open slot wherein the one or more supply cables and supply pipes are continuous and uninterrupted through a passage formed through the flange and the bracket U-shaped open slot into the welding head, whereby the one or more of the supply cables and supply pipes are arranged completely inside the robot and inside of the welding head, without the need to lay separate cables or pipes for the welding head connected to the one or more of the supply cables and supply pipes of the robot in correspondence of the flange.

6. The electric spot welding head according to claim 5, wherein the welding head is completely covered by a casing consisting of two lateral half-shells, made of plastic coupled together, having main walls parallel to the general plane of the two electrode-holding arms, the casing having a rear opening for connection of the supporting structure to a flange carried by the robot wrist and a front opening from which the two electrode-holding arms of the welding head protrude.

\* \* \* \* \*